Figure 1:
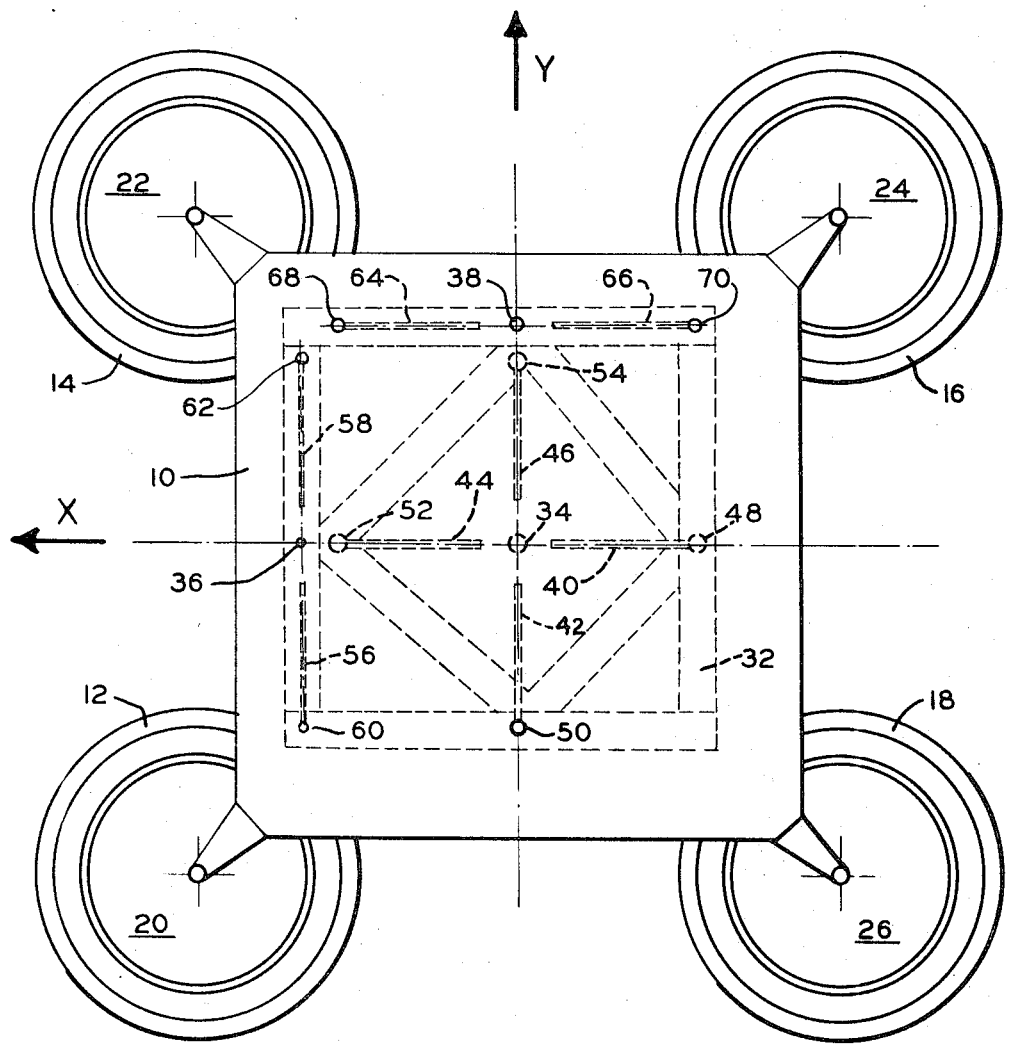

United States Patent

[11] 3,559,936

[72] Inventor Andre J. Guyon
 Binghamton, N.Y.
[21] Appl. No. 779,032
[22] Filed Nov. 26, 1968
[45] Patented Feb. 2, 1971
[73] Assignee Singer-General Precision, Inc.
 Binghamton, N.Y.
 a corporation of Delaware

[54] MOTION SIMULATOR
 4 Claims, 2 Drawing Figs.
[52] U.S. Cl. ..................................................... 248/179,
 35/12; 248/2
[51] Int. Cl. ..................................................... G09b 9/08
[50] Field of Search........................................... 248/2, 1,
 23, 396, 398, 180, 188.2, 179; 35/12P; 114/123,
 191, 195; 180/41; 33/223

[56] References Cited
UNITED STATES PATENTS
2,344,454  3/1944  Plotner.......................... 35/12
2,408,169  9/1946  Hoffer........................... (248/180UX)
3,295,224  1/1967  Cappel.......................... 35/12

Primary Examiner—Roy D. Frazier
Assistant Examiner—J. Franklin Foss
Attorneys—Francis L. Masselle, William Grobman and C. S. Mc Guire ABSTRACT: A motion simulator having mechanical actuators for moving a platform, or the like, in a controlled manner within specified limits and including fluid means arranged to exert a buoyant force opposing the gravity vector of the platform and equipment mounted thereon. In the disclosed embodiment, the buoyant means comprise a plurality of floats immersed in a liquid and connected to the motion platform by means of rigid links connected at opposite ends by means of suitable joints to the floats and platform.

MOTION SIMULATOR

The present invention relates to motion systems wherein a structure or body is arranged for movement in a controlled manner through specified limits to simulate motions, accelerations, attitudes, etc. of actual mechanisms or other movable bodies. More specifically, the invention relates to motion systems of the type which employ extensible actuators connected between a fixed base and a motion platform, or the like, for imparting controlled motions to the latter.

Motion simulators of the type commonly applied, for example, in the field of aircraft simulators normally utilize a number of hydraulically actuated, extensible members suitably connected between a fixed base and the station to be moved in a controlled manner. The hydraulic actuators offer a number of advantages and conveniences in the construction of such motion systems, but suffer from the disadvantage of enormous power requirements and high, concentrated floor loads as the weight of the station to be moved increases. For example, the cockpits, visual simulation apparatus, and other equipment associated with many large aircraft simulators presently in use for the training of pilots commonly weigh several tons. Although the provision of power supplies and mounting systems to withstand the heavy loads is within the present state of the art, the greatly increased cost and safety hazards associated therewith are apparent.

Accordingly, it is a principal object of the present invention to provide a motion simulator which allows the use of a wide variety of actuator types and configurations while greatly reducing the power requirements and loads on the motion base relative to similar prior art devices.

Another object is to provide a practical motion simulator allowing motion in any desired number of degrees of freedom having buoyant means opposing the gravitational forces on the motion platform.

Still another object is to provide a system of floats immersed in a liquid medium wherein the buoyant forces of the floats are utilized to balance the gravitational forces on the movable station of simulator apparatus.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

Figure 2:
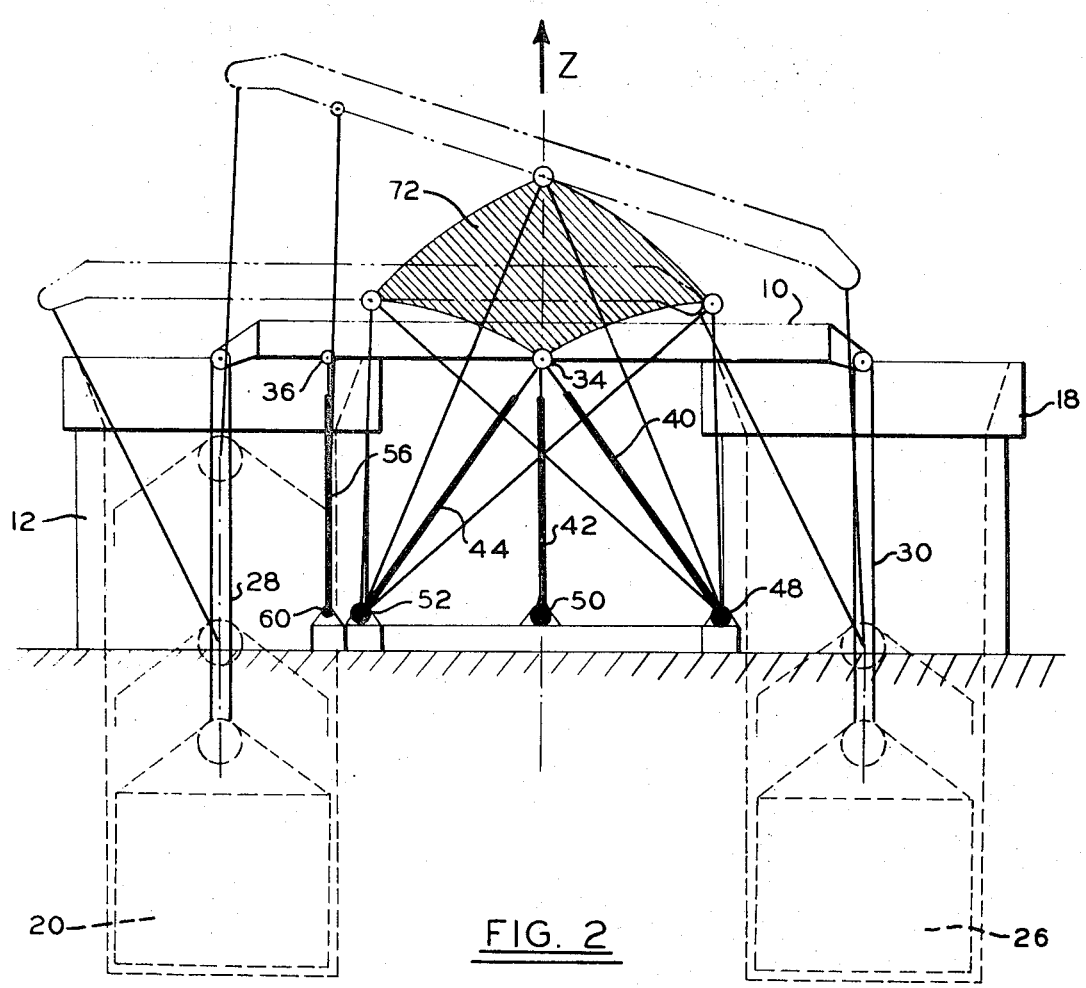

For a fuller understanding of the nature and objects of the invention reference should be had to the following detailed description taken in connection with the accompanying drawings, in which:

FIG. 1 is a top plan view of one embodiment of a motion simulator embodying the present invention; and FIG. 2 is a side elevational view of the apparatus of FIG. 1.

Motion systems of the type contemplated by the present invention are commonly used in connection with training apparatus such as flight simulators, and the like. The object of such systems is to impart to the cockpit or student station accelerations which are corresponding in direction and proportional in magnitude to those experienced in a real aircraft under actual flight conditions. Although the illustrated embodiment of the present invention shows only a rectangular platform to which motion is imparted, it will be understood that an appropriate student station, such as a simulated aircraft cockpit, as well as additional apparatus such as visual simulation equipment, would be mounted upon such platform in actual practice. Since the type of configuration of such apparatus has no bearing on the present invention, it has been omitted from the drawings in the interest of clarity and brevity. Also, it will be immediately apparent that the configuration of the motion platform is not critical, being subject to a virtually unlimited number of configurations in accordance with the design requirements of a particular system.

Referring now to the drawings, the reference numeral 10 denotes a motion platform or other suitable support for the station to which motion is to be imparted by the motion simulator. The arrows marked X and Y denote the axes in the horizontal plane about which platform 10 may be rotationally moved to simulate roll and pitch motion, respectively, and along which the platform may be moved in horizontal translation. Open-topped containers 12, 14, 16 and 18 are arranged beneath each of the corners of platform 10. Within each of the containers are buoyant elements 20, 22, 24 and 26, respectively, constructed of any suitable material having natural buoyancy or as hollow structures utilizing entrapped air to provide the required buoyant force. Each of the containers is filled with water or other suitable liquid in which the respective buoyant elements are immersed.

As seen more clearly in FIG. 2, rigid links 28 and 30 are connected between buoyant elements 20 and 26 and the respective adjacent corners of platform 10. Similar links extend between buoyant elements 22 and 24 and the corners of the platform adjacent thereto. Each of the links are connected by suitable joints to allow movement of the platform relative to the buoyant elements in the desired number of degrees of freedom. For example, six degrees of freedom may be achieved by using a two-axis gimbal joint at the lower end (connecting the links to the buoyant elements) and a ball joint at the upper end (connecting the links to the platform).

Suitable means for imparting motion to platform 10 are provided in the form of extensible hydraulic actuators. Typical constructions and operation of such actuators are shown, for example, in U.S. Pat. Nos. 3,295,224 and 3,288,421, and are therefore shown somewhat diagrammatically in the present drawings. The illustrated configuration shows a total of eight actuators connected between platform 10 and base support frame 32, although a wide variety of configurations is possible, as indicated in the aforementioned U.S. Patents and elsewhere in the prior art. The platform is supported at essentially three points 34, 36 and 38. Actuators 40, 42, 44 and 46 are connected between point 34 on the lower side of platform 10 and points 48, 50, 52 and 54 on support frame 32, respectively. Actuators 56 and 58 are connected between point 36 on the platform and points 60 and 62, respectively, on the base. Actuators 64 and 66 are connected between point 38 on the platform and points 68 and 70 on the base. It will be understood, of course, that each of the actuators is suitably articulated at each end by means of conventional joints to provide the desired degrees of freedom of the motion platform relative to the fixed base. Thus, where more than one actuator is connected at a location described as a point, it will be understood that such connections may be by means of separate joints at closely spaced points.

Vertical translation of platform 10 along the Z axis may be effected by simultaneous extension or retraction of all eight actuators. Rotation about the Z axis, or yaw motion, may be effected by a combination of extension of actuators 58 and 66 with simultaneous retraction of actuators 56 and 64, or vice versa. Rotation about the Y axis, or pitch motion, is caused by extension or retraction of actuators 56 and 58. Roll motion about the X axis is caused by extension or retraction of actuators 64 and 66. Translation along the X axis is effected by extending actuators 40 and 66 while retracting actuators 44 and 64, or the opposite. Translation along the Y axis requires extension of actuators 42 and 56 while retracting actuators 46 and 58, or vice versa. Shaded area 72 in FIG. 2 provides an illustrative example of a possible "motion envelope" (in one plane) of point 34 on the lower side of platform 10.

The limits of excursion of platform 10 in any given degree of freedom will be determined by the size and configuration of the actuators, as well as by the design of the buoyant elements and containers relative to the platform and connecting linkage. The general arrangement, however, shown in the present drawings is suitable to provide an acceptable range of motion excursion for many applications. It will be noted that the containers in the illustrated embodiment extend about half of their length above and half below the floor level, but this is also subject to design preference. The volume of the buoyant elements required to provide the necessary upward force on the platform may be easily calculated by well-known mathematical principles. As previously mentioned, it is preferred that the buoyant elements remain entirely immersed in the liquid throughout the excursion of platform 10 so that a constant upward force is always provided, regardless of the position of the platform. The clearance between the buoyant elements and the inside of the containers will, of course, influence the degree of damping effect which the movement of the buoyant elements exerts on the motion of the platform. This will also be affected by the viscosity of the liquid, which must be taken into account when formulating the drive signals for the actuators to provide the desired velocities and accelerations. Finally, it should be noted that design modifications within the scope of the invention would allow constructions utilizing a gaseous, rather than a liquid, medium to provide the required buoyant force (e.g., "air springs" and modifications thereof).

I claim:

1. A motion simulator providing controlled motion to a body in space and comprising, in combination:
   a. a rigid frame supporting the body to be moved in a controlled manner;
   b. actuator means arranged to impart motion to said frame relative to a fixed base, said actuator means including a plurality of extensible actuators connected at opposite ends to said support frame and said base;
   c. control means for selectively controlling movement of said actuators; and
   d. buoyant means including a liquid medium and float means disposed and movable in said liquid and mechanically connected to said frame to exert thereon a biasing force opposing the gravitational force and representing a substantial fraction of said gravitational force, thereby substantially reducing the force required by said actuators to move said frame and body in opposition to said gravitational force.

2. The invention according to claim 1 wherein said float means are constrained for movement in a substantially vertical path within container means for said liquid.

3. The invention according to claim 2 wherein a rigid link is connected at one end to said float means by a first joint and to said frame by a second joint, the total degrees of freedom of said first and second joints being at least equal to the degrees of freedom of movement of said frame relative to said fixed base provided by said actuator means.

4. The invention according to claim 1 wherein said float means remain completely immersed in said liquid throughout all movement which may be imparted to said support means by said actuators.